(12) United States Patent
Hanson

(10) Patent No.: US 10,064,397 B2
(45) Date of Patent: Sep. 4, 2018

(54) AQUARIUM THEATER DEVICE

(71) Applicant: Edward Hanson, York, ME (US)

(72) Inventor: Edward Hanson, York, ME (US)

( * ) Notice: Subject to any disclaimer, the term of this patent is extended or adjusted under 35 U.S.C. 154(b) by 169 days.

(21) Appl. No.: 15/266,280

(22) Filed: Sep. 15, 2016

(65) Prior Publication Data

US 2017/0071171 A1 Mar. 16, 2017

Related U.S. Application Data

(60) Provisional application No. 62/219,149, filed on Sep. 16, 2015.

(51) Int. Cl.
| | | |
|---|---|---|
| *A01K 63/02* | (2006.01) | |
| *A01K 63/06* | (2006.01) | |
| *A01K 63/00* | (2017.01) | |
| *A01K 63/04* | (2006.01) | |
| *H04R 1/02* | (2006.01) | |
| *H04W 4/80* | (2018.01) | |

(52) U.S. Cl.
CPC .......... *A01K 63/006* (2013.01); *A01K 63/047* (2013.01); *A01K 63/06* (2013.01); *A01K 63/065* (2013.01); *H04R 1/028* (2013.01); *H04R 2420/07* (2013.01); *H04R 2420/09* (2013.01); *H04W 4/80* (2018.02)

(58) Field of Classification Search
CPC .... A01K 63/006; A01K 63/003; A01K 63/06; A01K 63/065; A01K 63/047; A01K 63/045
USPC ................. 119/246, 247, 253, 255, 257, 248
See application file for complete search history.

(56) References Cited

U.S. PATENT DOCUMENTS

| | | | | |
|---|---|---|---|---|
| 2,293,612 A | * | 8/1942 | Montague | H05K 11/00 119/247 |
| D500,478 S | * | 1/2005 | Bivona | D14/129 |
| 7,886,696 B2 | * | 2/2011 | Marks | A01K 63/04 119/248 |
| 2005/0051107 A1 | * | 3/2005 | Hsieh | A01K 63/003 119/257 |
| 2005/0178339 A1 | * | 8/2005 | Choe | A01K 63/003 119/257 |
| 2006/0231041 A1 | * | 10/2006 | Bilow | A01K 63/003 119/253 |
| 2012/0174871 A1 | * | 7/2012 | Grabois | A01K 63/003 119/265 |
| 2013/0092093 A1 | * | 4/2013 | Potts | A01K 63/003 119/247 |
| 2014/0320064 A1 | * | 10/2014 | Chien | A63H 3/003 320/107 |

FOREIGN PATENT DOCUMENTS

| | | | | | |
|---|---|---|---|---|---|
| GB | 2282308 A | * | 4/1995 | | A01K 63/06 |
| JP | 03151817 A | * | 6/1991 | | |

* cited by examiner

*Primary Examiner* — Son T Nguyen
(74) *Attorney, Agent, or Firm* — Jeffrey Joyce, Esq

(57) ABSTRACT

An aquarium device having a compartment for a video playing device that is viewable through an aquarium tank for conveniently enhancing the viewing experience. The device includes a filtration system that is concealed from the viewer and that filters the water around the video device without exposing the device to water or any other elements of the aquarium's habitat.

11 Claims, 6 Drawing Sheets

AQUARIUM THEATER DEVICE

BACKGROUND INFORMATION

Field of the Invention

The invention relates to aquariums and video systems, more particularly, it relates to an aquarium system that incorporates a video playing device.

Discussion of Prior Art

Aquariums have been known for a considerable amount of time. They vary in size and shape, but in most instances are generally intended to hold fish and other organisms that live in the water, along with various decorations for people's viewing enjoyment. Such aquariums generally include filtration systems that are designed to maintain the cleanliness of the aquarium. However, while often pleasing to the eye, these displays tend to be somewhat static in nature, as replacing the decorations can be tedious, burdensome and costly. Such displays are also limited to organisms and decorations that can fit and survive in a small confined space.

What is needed, therefore, is a simple and convenient means for enhancing the visual experience while also providing a simple and convenient means for dynamically changing the experience.

BRIEF SUMMARY OF THE INVENTION

The invention is a single unit aquarium system that includes three compartments to create a dynamic viewing experience. The first compartment is a tank compartment, which is to be filled with water to create a habitat for fish and other water-based organisms. The second compartment is a video device compartment, which is sized to hold a video playing device, such as, for example, an APPLE IPAD, SAMSUNG tablet, or a common laptop. The third compartment is a filtration compartment that includes a filtration system to clean and recycle the water held in the tank compartment. The video device compartment is situated between the tank compartment and the filtration compartment such that the video device is visible to a viewer through the tank compartment.

The video playing device is used to dynamically play any number of different types of videos, including, for example, videos of underwater or deep sea explorations, videos of a child's favorite cartoon character, or advertisements for a given business.

BRIEF DESCRIPTION OF THE DRAWINGS

The present invention is described with reference to the accompanying drawings. In the drawings, like reference numbers indicate identical or functionally similar elements. The drawings are not drawn to scale.

DETAILED DESCRIPTION OF THE INVENTION

Figure 1:
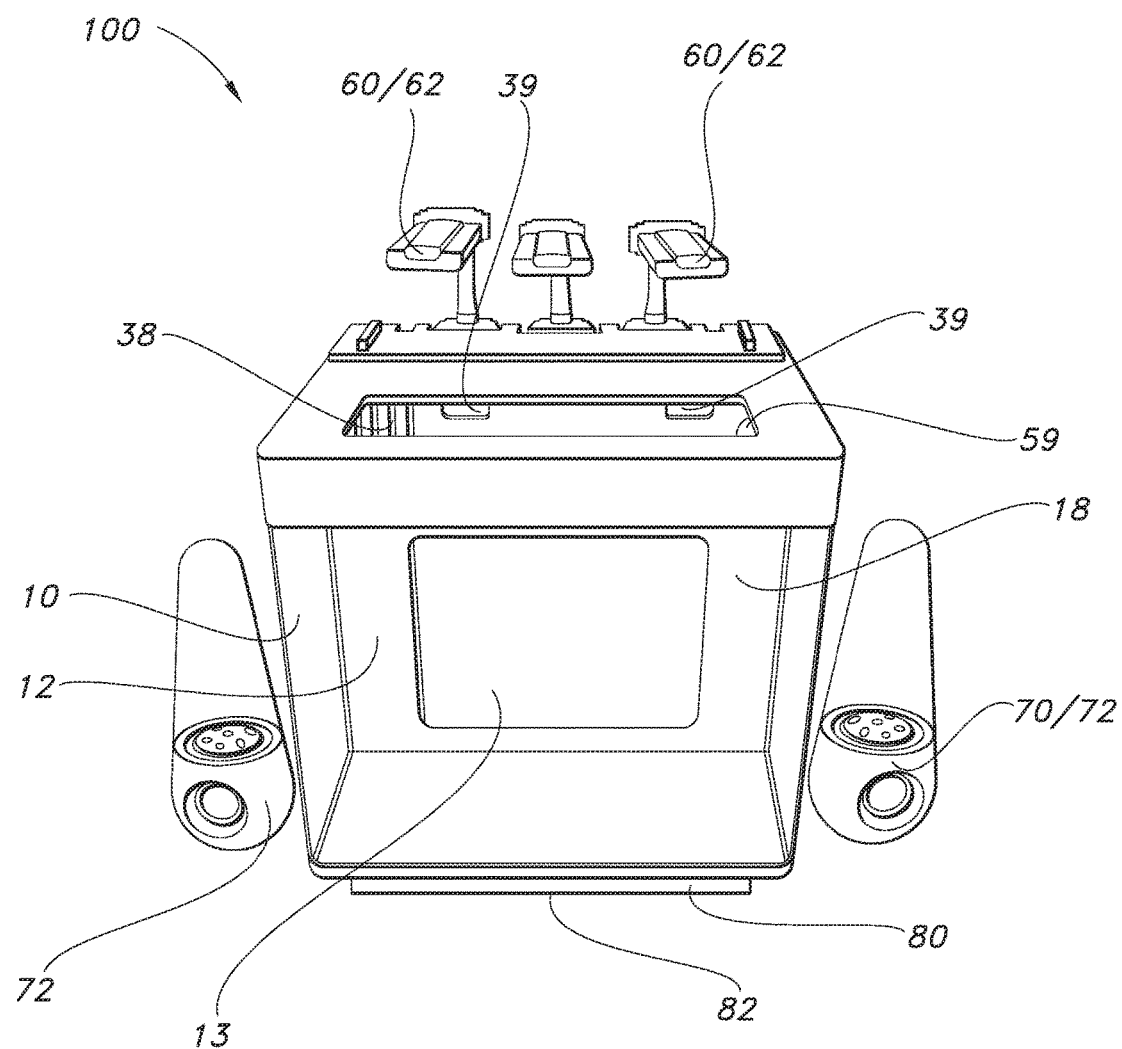
FIG. 1 is a front view of the device according to the invention.

The present invention will now be described more fully in detail with reference to the accompanying drawings, in which the preferred embodiments of the invention are shown. This invention should not, however, be construed as limited to the embodiments set forth herein; rather, they are provided so that this disclosure will be complete and will fully convey the scope of the invention to those skilled in the art.

FIGS. 1-6 illustrate an aquarium device 100 according to the invention that is a single unit that includes a tank compartment 10, video device compartment 30, and filtration compartment 50. The device 100 is configured such that the tank compartment 10 is the foremost compartment that is in a position that is most visible to a viewer, the video device compartment 30 is placed behind the tank compartment 10, and the filtration compartment 50 is in the back of the device 100 behind the video device compartment 30.

The tank is filled with water and whatever organisms and decorations the owner of the device wishes to view, such as fish and commonly available decorations. A video playing device V is placed in the video device compartment 30 and a video is activated. For example, a user may fill the tank 10 with water and small tropical fish, and then use the video device to play a video of a tropical underwater exploration, thus providing a deeper and more dynamic experience for the viewers. There are a number of suitable video playing devices, such as an APPLE IPAD or other similarly sized electronic tablet. Behind the video device compartment 30 is the filtration compartment 50 which contains a common filtration system to filter the water in the tank compartment 10.

Figure 4:
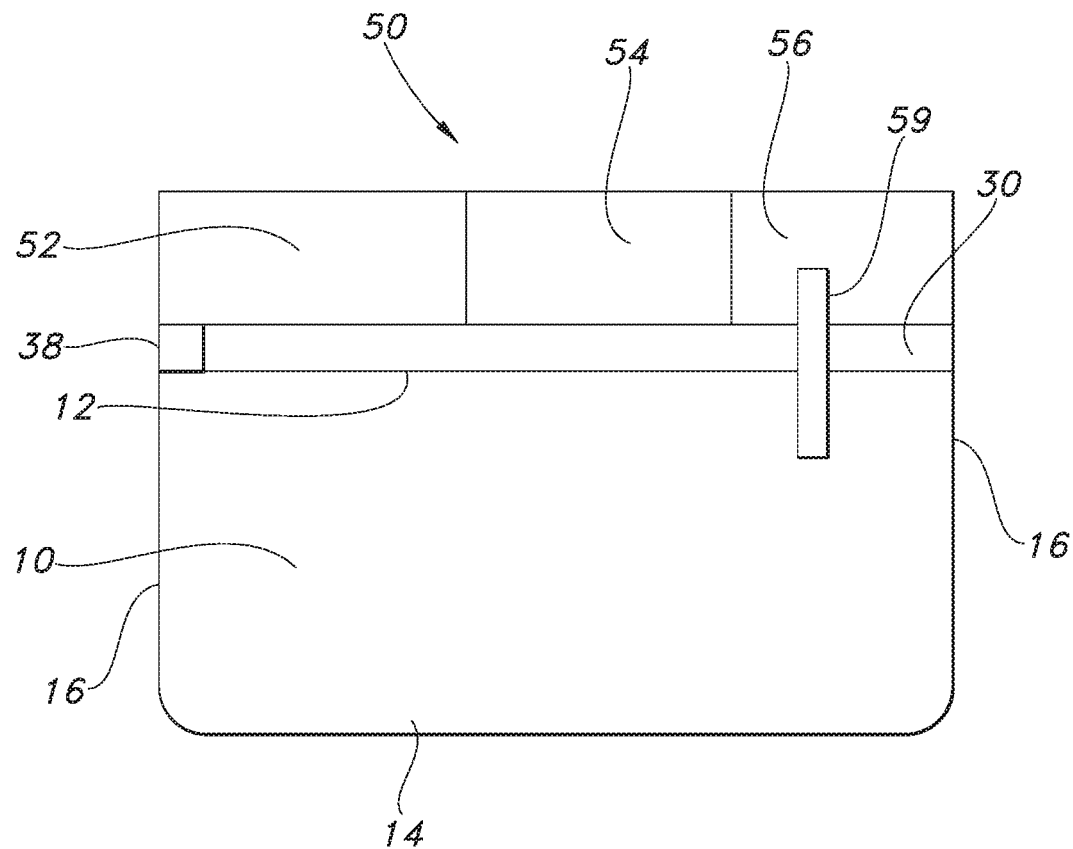
FIG. 4 is a top view of the device.
Figure 5:
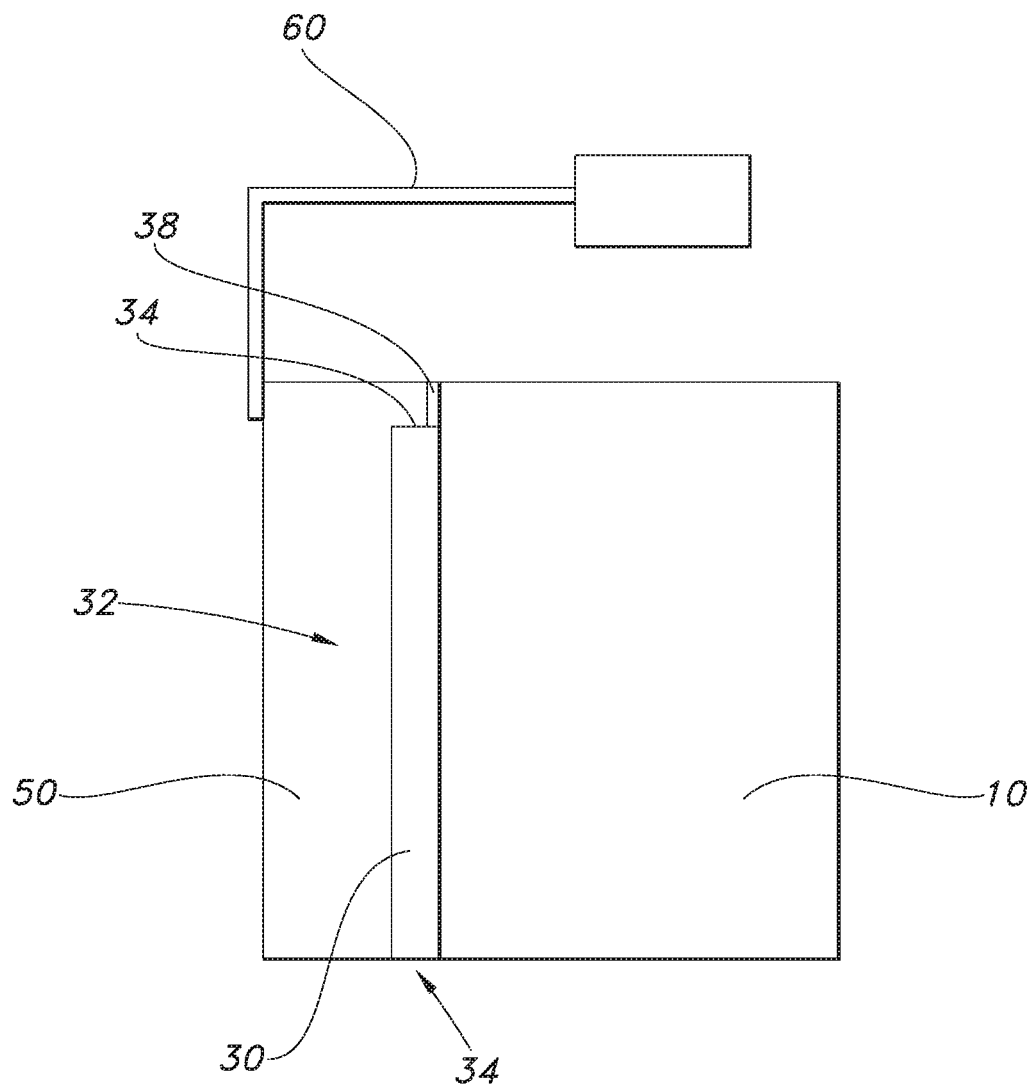
FIG. 5 is a side view of the device.
Figure 6:
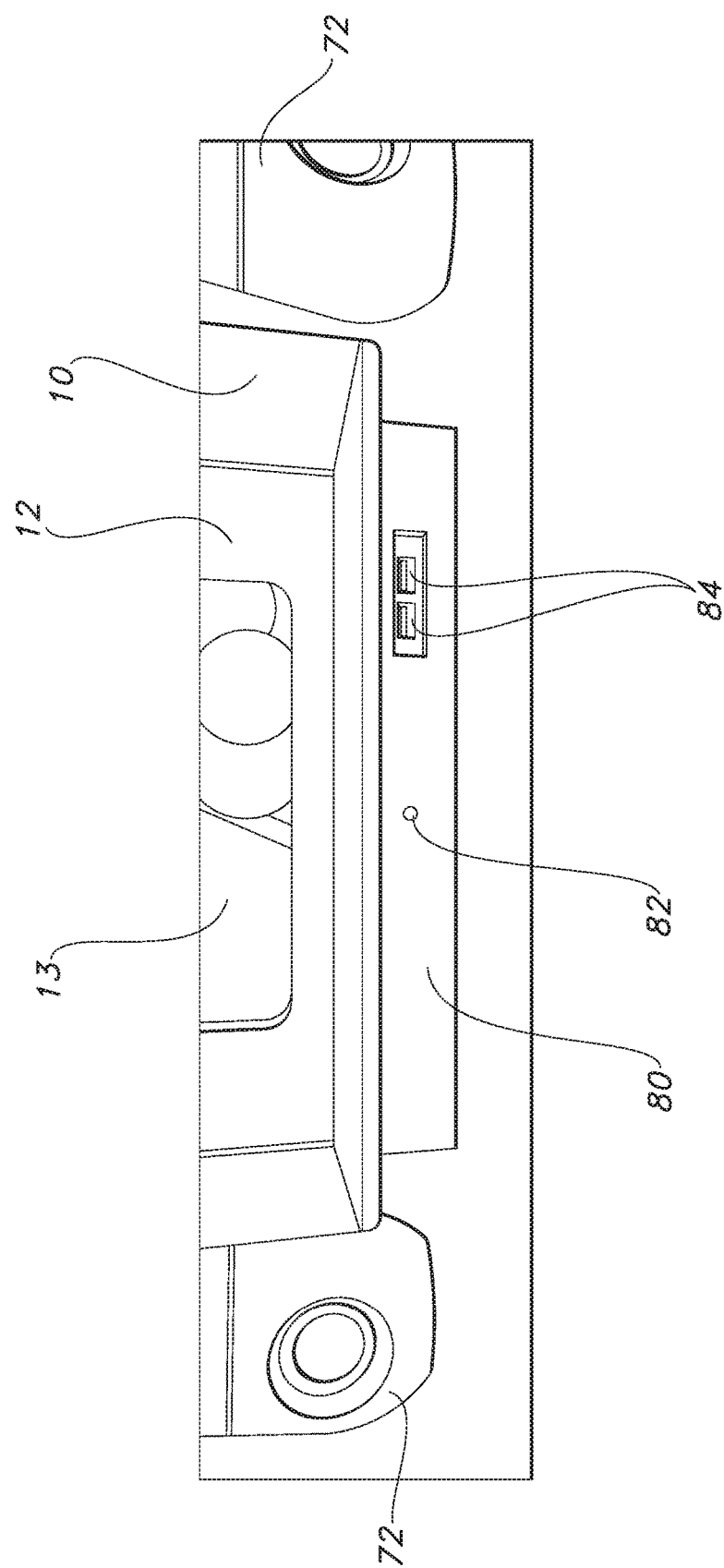
FIG. 6 is a front view of the device showing the base and lower portion of the tank compartment.

The tank compartment 10 is a water tight container that is largely transparent so as to allow an observer to view the contents. FIG. 4 illustrates the tank 10 having a rear side 12 that includes a transparent viewing window 13 that is roughly the size and shape of the video playing device V. The tank has a front side 14 that may be any suitable shape. In the embodiment shown, the front 14 is rectangular and the tank has two sides 16 that connect the front side 14 to the rear side 12 which has a colored outer edge 18 that frames the video device V. In another embodiment not shown, the front side 14 is curved and connects directly to the rear side 12.

The video device compartment 30 contains an open slot 32 on at least one side of the device 100 where a video device V is insertable into a viewing position. The compartment 30 is sized to fit the video device firmly in the proper viewing position. In the embodiment shown, the frame 18 obscures the outer edge of the video device V as well as any cables that may be attached to the video device V. The video compartment 30 has a top 34 that is water tight so as to protect the video device V from water that is passing between the tank 10 and filtration compartment 50 and a bottom 36 to support the device in its desired position. As water is pumped from the filter compartment 50 into the tank compartment 10 the water level rises until water flows through one or more small water flow notches 38 near the top of the tank compartment 50 where it flows over the water tight top 34 of the video compartment 30 and back into the filtration compartment 50. Additional overflow notches 39 may be provided to allow water to pass between chambers in the event that the water flow notches 38 become clogged or otherwise inoperable.

The filtration compartment 50 receives water through the small water notches 38, filters the water with any suitable filtration system, and then returns the filtered water to the tank through filtration pump 58 and hose 59. In the embodiment shown, the filtration system 50 includes a water reservoir 52, a filter media chamber 54, and a pump chamber 56 for storing the pump 58. A number of filtration systems are suitable, for example, a standard wet/dry system. The water reservoir 52 may also include a heating element (not shown).

Figure 2:
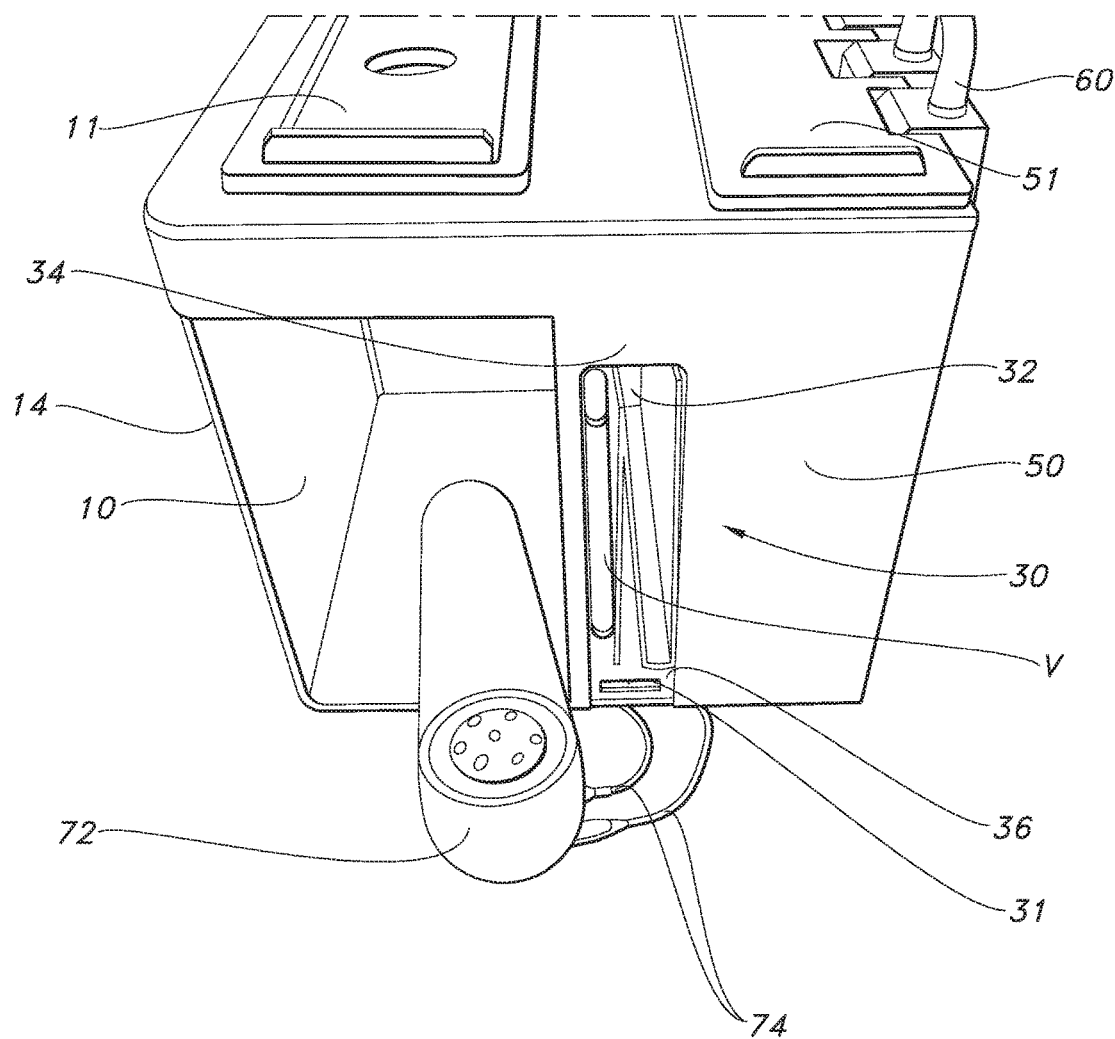
FIG. 2 is a side view of the device.
Figure 3:
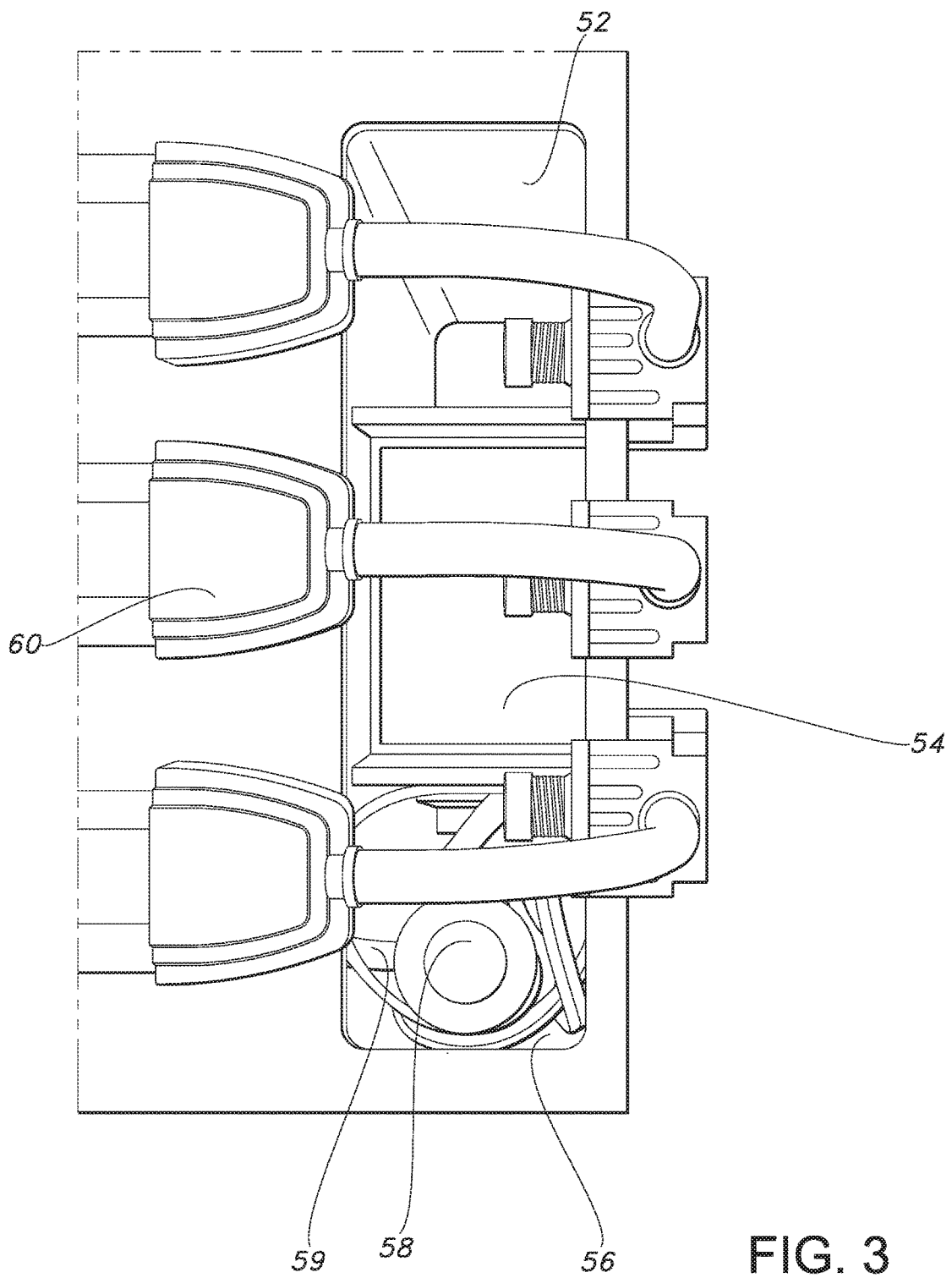
FIG. 3 is top view of the device showing the filtration compartment.

Additional components may also be provided, for example, lighting 60 and speaker 70 systems. In the embodiment shown, three lights 62 and two speakers 72 are provided. The tank 100 has a base 80 that supports the device 100 and conceals the wires and sensors necessary to control the lighting 60 and speaker 70 systems. The lights are connected to an external power source (not shown), and are controlled by RF sensors 82 that are located in the base 80. The speakers 72 connect to power cords 74 that run through the base 80 to an external power source (not shown). The speakers 72 connect via Bluetooth to the video playing device V. A tank compartment cover 11 and filter compartment cover 51, as shown in FIG. 2, may be provided. A slot 31 is also provided to secure a video device cover (not shown) on the side of the video compartment 30. USB ports 84, shown in FIG. 6, that are connected to an external power source are also provided.

In another embodiment not shown the video device compartment 30 is open on both the side 32 and the bottom 34 to allow an open laptop (not shown) to be used as the video device V and inserted into the video device compartment 30. In this case, the laptop's monitor is visible in the video device compartment 30 through the tank compartment 50 and the remainder of the laptop is positioned beneath the tank compartment 10. In this embodiment additional support elements (not shown) are added beneath the tank compartment 10 and the filtration compartment 50 to support the weight of the device 100 above the portion of the video device that is beneath the tank compartment 10.

It is understood that the embodiments described herein are merely illustrative of the present invention. Variations in the construction of the aquarium device may be contemplated by one skilled in the art without limiting the intended scope of the invention herein disclosed and as defined by the following claims.

What is claimed is:

1. An aquarium theater device that displays a video playing device, the aquarium theater device comprising:
   a tank compartment, a video playing device compartment, and a filtration compartment;
   the tank compartment being a water tight container that is mostly transparent and has a rear side that includes a viewing window that is mostly transparent;
   the video device compartment having a front side and a back side, the front side being located behind the rear side of the tank compartment, the video device compartment further including a top that is water tight and a side having an open slot;
   the filtration compartment containing a filtration system, the filtration compartment located on the back side of the video device compartment; and
   wherein a video playing device is inserted into the video device compartment through the open slot and viewable through the viewing window in the tank compartment; and
   wherein the tank compartment is fillable with a liquid that is filterable through the filtration system, the liquid passing from the tank compartment over the top of the video playing device compartment and into the filtration compartment and then back into the tank compartment.

2. The device of claim 1 wherein the video device compartment includes at least one water flow notch that allows water to pass from the tank compartment, over the video device compartment and into the filtration compartment and wherein the filtration system includes a filtration pump that returns filtered water to the tank compartment from the filtration compartment.

3. The device of claim 2 wherein the filtration compartment includes a water reservoir that receives the water from the tank compartment, a filtration chamber that contains the filtration system, and a pump chamber that contains the filtration pump and wherein water flows from the tank compartment to the water reservoir and from the water reservoir into the filtration chamber and then into the pump chamber.

4. The device of claim 3 wherein the water reservoir includes a heating element.

5. The device of claim 4 further comprising a base situated beneath the tank compartment, the video device compartment and the filter compartment, and a lighting system that includes a number of lights situated above the tank compartment and sensors located in the base for controlling the lights.

6. The device of claim 5 further comprising a speaker system that connects to the video playing device.

7. The device of claim 6 wherein the speaker system connects to the video playing device by a BLUETOOTH connection.

8. The device of claim 7 wherein the base includes one or more USB ports.

9. The device of claim 1, wherein the transparent viewing window is approximately the size and shape of the video playing device.

10. The device of claim 9, wherein the video device compartment is sized to firmly hold an electronic tablet.

11. The device of claim 10, wherein the tank compartment includes a frame around the viewing window.

* * * * *

UNITED STATES PATENT AND TRADEMARK OFFICE
CERTIFICATE OF CORRECTION

PATENT NO. : 10,064,397 B2  
APPLICATION NO. : 15/266280  
DATED : September 4, 2018  
INVENTOR(S) : Edward Hanson Page 1 of 1

It is certified that error appears in the above-identified patent and that said Letters Patent is hereby corrected as shown below:

In the Claims

Column 3, Lines 47 - 48 are corrected to read:
1. An aquarium theater device comprising:

Signed and Sealed this
Twenty-sixth Day of February, 2019

Andrei Iancu
*Director of the United States Patent and Trademark Office*